3,682,655
METHOD FOR COOKING MEAT
Ali R. Touba, Minneapolis, Minn., assignor to
General Mills, Inc.
No Drawing. Filed Apr. 6, 1970, Ser. No. 26,066
Int. Cl. A22c 18/00
U.S. Cl. 99—107                                    3 Claims

ABSTRACT OF THE DISCLOSURE

Meat is cooked under compression between a pair of heated surfaces having a temperature of between 400° F. and 600° F., said surfaces being urged against the meat with a force of between 1 and 50 p.s.i.g., said force being sufficient to provide direct heat transmitting physical contact between the meat and said heated surfaces, said force being sufficient to cause steam, formed on contact of the heated surfaces with the meat, to migrate into said meat thereby eliminating any steam layer between the meat and the heated surfaces, and said force being sufficient to compress the meat to a thickness of between 3/16 and 1/2 inch.

BACKGROUND OF THE INVENTION

The present invention relates to a method for cooking food materials and more particularly relates to a method of cooking meat between heated surfaces.

Cooking of food materials is, of course, a very old art and has been practiced using many different methods. Perhaps meat was first cooked by actually placing the meat in an open fire or very near an open fire. The art later progressed to pan cooking such as frying or boiling of meat and, still later, apparatus was developed to cook meat between a pair of heated platens as is illustrated in Pat. No. 2,915,397.

The known methods for cooking meat, particularly frying methods, possess certain inherent disadvantages foremost of which is the extended amount of time required to properly cook the meat. The cooking time required is of particular importance to short order and ready to eat carry out food suppliers. For example, the slowness of previous methods often has made it necessary to prepare hamburgers in advance of rush hour demands. Generally, such advance preparation results in a substantial decrease in quality even though the storage period is relatively short.

The present invention provides a very rapid method for cooking meat. In one instance it was found that hamburger could be cooked in 30 seconds using the present invention whereas pan frying required 178 seconds to achieve an equal degree of cooking. In another instance it was found that chicken breast could be cooked in 45 seconds whereas oven broiling required 2400 seconds in order to achieve an equal degree of cooking.

The present invention not only provides a very rapid method of cooking but also provides improved quality particularly in certain types of product, such as chuck steak. A hamburger cooked in accordance with the present invention has a highly desirable surface browning and yet is moist and tender. The surface browning provides improved appearance and improved taste. A hamburger cooked according to the present invention has a highly desirable internal structure which may be described as being loose, tender and juicy, whereas pan fried hamburgers are compact, gummy and somewhat dry. A hamburger, which was cooked according to the present invention, was found to lose less than 20% of the original weight during cooking and a hamburger, which was pan fried, was found to lose nearly 30%.

THE PRESENT INVENTION

In the present invention meat is roasted between a pair of heated surfaces which exert compressive force on the meat. Any desired type of meat may be roasted by the present method, for example, various cuts of beef, pork, lamb, and veal as well as hamburger, chicken and fish. The meat, at the time of cooking, may be whole cuts such as steak or ground such as hamburger. The roasting conditions, of course, may vary somewhat depending on the particular variety of meat being roasted, the thickness of the meat, the tenderness of the meat, and the degree of cook desired. Illustrative cooking conditions that may be used in carrying out the present invention are as follows: The temperature of the heated surfaces, for example, may be between 400 and 600° F. The pressure exerted on the meat typically may be between 1 and 50 p.s.i.g. (pounds per square inch gauge). The cooking time may be between 15 and 100 seconds.

The temperature used in the present invention should be sufficient to rapidly form steam upon contact of the heated surfaces with the meat. However, the temperature should not be so high as to produce a substantial amount of surface scorching of the meat. The most preferred temperature has been found to be about 500° F. Temperature, unless otherwise specified, is intended to mean the temperature of the heated surfaces.

The amount of heat energy available from the heated surfaces is of importance. The heated surfaces preferably contain sufficient heat energy so that the temperature of the surfaces remains substantially constant throughout the roasting cycle and in any event the temperature remains sufficient to rapidly produce steam. For example, the temperature preferably varies less than 50° F. during the roasting time. The heated surfaces should be constructed of a material that can rapidly transfer heat energy to the meat. Such a heat energy content and rapid heat transfer can be provided by metal plates having a substantial mass in comparison to the mass of the meat being cooked.

The compressive force exerted by the heated surfaces on the meat must be sufficient to provide good physical contact between the heated surfaces and the meat. In other words the heated plates are urged against the meat with sufficient force so that the steam created therebetween is driven into the meat. In some instances it is believed that the steam, after entering the meat, travels parallel to the heated surfaces and either condenses or escapes through the edge of the piece of meat which, of course, is under a reduced pressure, such as at or near atmospheric pressure. This phenomenon produces the loose, flaky internal structure in hamburger and chicken. Previous methods for cooking meat between heated plates have failed to recognize the importance of pressure and have, therefore, resulted in a layer of steam between the heated surfaces and the meat. Meat cooked under the compressive force of the present invention has a surface browning with less overall dehydration of the meat. The surface browning is believed to be due to direct contact between the meat and the heated surfaces and to the absence of the steam layer found in the prior art. Of course, the compressive force used should not be so great that the meat will be excessively flattened. Typically, a force of between 1 and 50 p.s.i.g., generally between 2 and 30 p.s.i.g., has been found satisfactory for most types of meat. Furthermore, it has been found that the appropriate amount of force is applied when the meat is compressed between 10 and 70% of the original thickness, although a greater amount of compression may be desirable in the case of thick pieces of meat such as chicken breasts. The preferred compressed thickness is about 3/16 to 1/2 inch. The meat, of course, regains a certain amount of thickness upon release of the compressive force.

The cooking time required depends on several factors such as the type of meat, the thickness of the meat, the temperature of the heated plates and the degree of cook desired. The cooking time will be typically between 15 and 100 seconds.

The apparatus used to carry out the roasting methods described in the following examples was a 12 ton Carver laboratory press equipped with a pair of heated platens. The Carver press was hydraulically driven. Each platen was a steel plate approximately 6 inches by 6 inches by 1 inch. The platens were aligned one above the other with one of the plates being vertically moveable and the other plate being stationary. The platens or plates were electrically heated and had a total power input of about 1140 watts. The apparatus included a thermostat which controled the temperature of the plates and further included a dial gauge for measuring the pressure exerted between the plates. Provision was made for controlling the extent to which the meat was compressed. Typically, a metal spacer of the desired thickness may be placed between the plates.

The following examples are illustrative of the present invention and are not intended to be limiting. Of course, various other types of equipment may be used in carrying out the present invention. For example, one or both of the platens may be replaced with continuous belts so long as the necessary heat capacity and temperature is provided. Also, other types of force exerting apparatus may be used, such as mechanically, electrically or pneumatically powered apparatus.

Example I

The following illustrates the present invention as used for preparing a hamburger and also compares the present invention with previously known methods of cooking hamburger. Three portions I-A, I-B, and I-C of ground steak, each weight about 80 grams, were formed into substantially the spherical balls. Portion I-A was placed in the Carver Press under processing conditions of the present invention, namely, a pressure of about 1 p.s.i.g., a plate temperature of about 500° F. and cooked to a center temperature of about 150° F. The hamburger was compressed to a thickness of about 3/8 of an inch. The cook time was 30 seconds. The calculated cook time is about 70 seconds if the heat transfer to the meat was by conduction alone. The weight loss was 19.2%. The surface of the cooked hamburger was well browned and had a number of round openings extending down into the center of the hamburger which are believed to be steam channels. The internal structure of the hamburger was loose, flaky, tender and juicy. Portion I-B was placed in a conventional home-type waffle iron sandwich grill equipped with a pair of flat grill plates. The plates were heated to a temperature of 470° F. and the upper plate was pressed downwardly until the hamburger was 3/8 of an inch in thickness. The pressure then was released so that only the force on the hamburger was the weight of the upper plate. The hamburger was cooked until the center temperature was 150° F. The cook time was 70 seconds. The weight loss was 23.2%. Portion I-C was placed in a frying pan, the temperature of which was 400° F. The hamburger was compressed to 3/8 of an inch in thickness. Alternating sides of the resulting hamburger patty were exposed to fry pan. The hamburger was cooked to a center temperature of 150° F. The cook time was 178 seconds. The weight loss was 24.5%. The temperatures used with the grill and the frying pan were the upper limits for this equipment. The cooked portions I-B and I-C had gummy, compact internal structures. Thus, the present invention was found to produce a far more desirable product in less than half the time required for the conventional cooking methods.

Example II

The following illustrates use of the method of the present invention for cooking beef steak. The method was carried out substantially as described in Example I except that the meat was the large muscle from a T-bone steak. Portion II-A was cooked according to the present invention. Portion II-A was originally 1 inch in thickness and was compressed to 1/2 inch during cooking using a force of 50 p.s.i.g. The plate temperature was 500° F. Portion II-A was cooked to a center temperature of 142° F. in 45 seconds. Portion II-B was a piece of steak substantially identical to portion II-A except that it was originally 3/4 inch in trickness. Portion II-B was cooked in the aforementioned waffle iron sandwich grill. The waffle iron had a plate temperature of 470° F. Sufficient force was applied to the waffle iron sandwich grill to compress the meat to 1/2 inch. The force then was released except for the weight of the upper plate and the meat remained about 1/2 inch in thickness. Portion II-B was cooked to a center temperature of 142° F. in 91 seconds. Portion II-C was a piece of steak substantially identical to portion II-A except that it was originally 1/2 inch in thickness. Portion II-C was cooked in the aforementioned frying pan by alternatingly exposing the sides of the steak to the frying pan. The surface temperature of the frying pan was 400° F. Force was not applied to Portion II-C. Portion II-C was cooked to a center temperature of 142° F. in 244 seconds. Thus, portion II-A, which was cooked to the present invention required less than 20% of the time required for conventional frying in spite of the fact that it comprised twice as much meat as the conventionally fried portion II-C.

Example III

The following illustrates the effect of various amounts of pressure in carrying out the present invention. Portions III-A through III-F were cooked in the aforedescribed Carver press at a plate temperature of 500° F. Portions III-A through III-C were pieces of top round steak. The thickness of portions III-A through III-C during cooking in the Carver press was 3/8 of an inch. Portions III-D through III-F were pieces of New York cut boneless T-bone steak and were cooked at a thickness of 1/2 of an inch. Portions III-A through III-F were each cooked to a center temperature of 150° F.

TABLE I

| Portion | Initial thickness (inches) | Cook time (sec.) | Weight loss percent | Pressure (p.s.i.g.) | Area of surface browning, percent |
|---|---|---|---|---|---|
| A—Top round steak | 3/8 | 45 | 19.2 | 0.12 | 10 |
| B—Top round steak | 1/2 | 32 | 15.8 | 1.74 | 80 |
| C—Top round steak | 5/8 | 22 | 12.9 | 3.50 | 100 |
| D—New York cut | 1/2 | 88 | 15.0 | 0.11 | 5 |
| E—New York cut | 3/4 | 70 | 23.5 | 1.03 | 90 |
| F—New York cut | 1 | 64 | 13.1 | 6.55 | 100 |

The pressure when cooking steak should be at least about one p.s.i.g. in order to achieve the rapid rate of cooking and the desirable surface browning.

Example IV

The following illustrates that low quality meat can be upgraded, or in other words improved in quality, using the present invention. Two identical pieces of ranch steak were selected. Ranch steak is chuck steak that has been pounded with a blunt instrument like the edge of a silver knife. The two pieces, portions IV-A and IV-B were cooked to the same center temperature. Portion IV-A was cooked in the Carver press for 15 seconds and lost only 15% in weight during cooking. Portion IV-A was tender and juicy when eaten. Portion IV-B was oven broiled for 7 minutes on each side in the oven of a Hotpoint Custom Crest electric range. The oven was set on Broil and the meat was located 5 inches from the electric coils. The broiled meat lost 33% in weight during cooking. Portion IV-B, when eaten, was found to be poor in quality, tough and chewy.

Example V

The following illustrates various types of meat that have been cooked using the method of the present invention and compares the cook time with that required for oven broiling. The oven broiling was conducted as described in Example IV.

TABLE II

| Type of meat | Initial thickness (in.) | Present method | | | | Oven broiling | |
|---|---|---|---|---|---|---|---|
| | | Cooking thickness (in.) | Pressure (p.s.i.g.) | Cook time (sec.) | Weight loss (percent) | Cook time (sec.) | Weight loss (percent) |
| Sirloin | 3/4 | 1/2 | 4.0 | 35 | 12.2 | 600 | 26.5 |
| Beef shank | 5/8 | 3/8 | 9.0 | 45 | 18.6 | 780 | 27.5 |
| Pork loin chop | 7/8 | 3/8 | 11.5 | 45 | 21.5 | 960 | 30.5 |
| Veal loin chop | 5/8 | 3/8 | 15.8 | 50 | 24.5 | 960 | 27.5 |
| Bacon strip | 5/8 | 3/16 | 10.8 | 20 | 33.0 | 360 | 72.5 |
| Chicken breast | 1/2 | 3/8 | 9.0 | 45 | 17.4 | 2,400 | 36.7 |
| Cod fish | 3/4 | 1/2 | 5.3 | 50 | 12.5 | 480 | 38.3 |
| Lamb loin chop | 7/8 | 3/8 | 9.0 | 90 | 26.0 | 960 | 28.0 |

The embodiments of the invention in which an exclusive property or privilege is claimed are defined as follows:

1. A method for cooking meat comprising: compressing and heating meat between a pair of opposing heated surfaces, said heated surfaces having a temperature of between 400 and 600° F. thereby providing heat to rapidly form steam upon contact with said meat, said surfaces being urged against said meat with a force of between 1 and 50 p.s.i.g., said force being sufficient to provide direct heat transmitting physical contact between the meat and the heated surfaces, said force being sufficient to cause said steam to migrate into the meat thereby eliminating any steam layer between the meat and the heated surfaces, and said force being sufficient to compress the meat to a thickness of between 3/16 and 1/2 inch.

2. The method of claim 1 wherein said meat is hamburger and wherein said steam enters said meat in a path substantially perpendicular to the heated surfaces and travels through the meat in a path substantially parallel to the heated surfaces thereby producing a loose, flaky internal structure in said hamburger.

3. The method of claim 1 wherein said force is in the range of 2 to 30 p.s.i.g.

References Cited
UNITED STATES PATENTS

| | | | |
|---|---|---|---|
| 1,779,546 | 10/1930 | Jordan | 99—349 X |
| 2,070,850 | 2/1937 | Trabold | 99—107 X |
| 2,915,397 | 12/1959 | Telkes | 99—1 |
| 3,566,773 | 3/1971 | Chadwick | 99—349 |

HYMAN LORD, Primary Examiner